United States Patent
Haba et al.

(10) Patent No.: US 11,256,004 B2
(45) Date of Patent: Feb. 22, 2022

(54) DIRECT-BONDED LAMINATION FOR IMPROVED IMAGE CLARITY IN OPTICAL DEVICES

(71) Applicant: Invensas Bonding Technologies, Inc., San Jose, CA (US)

(72) Inventors: Belgacem Haba, Saratoga, CA (US); Rajesh Katkar, Milpitas, CA (US); Ilyas Mohammed, Santa Clara, CA (US)

(73) Assignee: INVENSAS BONDING TECHNOLOGIES, INC., San Jose, CA (US)

( * ) Notice: Subject to any disclaimer, the term of this patent is extended or adjusted under 35 U.S.C. 154(b) by 299 days.

(21) Appl. No.: 16/176,191

(22) Filed: Oct. 31, 2018

(65) Prior Publication Data

US 2019/0293838 A1    Sep. 26, 2019

Related U.S. Application Data

(60) Provisional application No. 62/645,633, filed on Mar. 20, 2018.

(51) Int. Cl.
  *G02B 1/10*    (2015.01)
  *G02B 1/02*    (2006.01)
  (Continued)

(52) U.S. Cl.
  CPC ............... *G02B 1/10* (2013.01); *G02B 1/02* (2013.01); *G02B 27/0172* (2013.01); *G02B 6/0055* (2013.01); *G02B 2027/0178* (2013.01)

(58) Field of Classification Search
  CPC ........ G02B 1/02; G02B 1/10; G02B 27/0172; G02B 6/0055
  (Continued)

(56) References Cited

U.S. PATENT DOCUMENTS

| 5,753,536 A | 5/1998 | Sugiyama et al. |
| 5,771,555 A | 6/1998 | Eda et al. |

(Continued)

FOREIGN PATENT DOCUMENTS

| JP | 2002-353416 A | 6/2002 |
| JP | 2006-276313 A | 10/2006 |

(Continued)

OTHER PUBLICATIONS

Ker, Ming-Dou et al., "Fully Process-Compatible Layout Design on Bond Pad to Improve Wire Bond Reliability in CMOS ICs," IEEE Transactions on Components and Packaging Technologies, Jun. 2002, vol. 25, No. 2, pp. 309-316.

(Continued)

*Primary Examiner* — Ricky D Shafer
(74) *Attorney, Agent, or Firm* — Lee & Hayes, P.C.

(57) ABSTRACT

Direct-bonded lamination for improved image clarity in optical devices is provided. An example process planarizes and plasma-activates optical surfaces to be laminated together, then forms direct bonds between the two surfaces without an adhesive or adhesive layer. This process provides improved optics with higher image brightness, less light scattering, better resolution, and higher image fidelity. The direct bonds also provide a refractory interface tolerant of much higher temperatures than conventional optical adhesives. The example process can be used to produce many types of improved optical components, such as improved laminated lenses, mirrors, beam splitters, collimators, prism systems, optical conduits, and mirrored waveguides for smartglasses and head-up displays (HUDs), which provide better image quality and elimination of the dark visual lines that are apparent to a human viewer when conventional adhesives are used in conventional lamination.

19 Claims, 4 Drawing Sheets

(51) Int. Cl.
*G02B 27/01* (2006.01)
*F21V 8/00* (2006.01)

(58) Field of Classification Search
USPC ............................................ 359/883
See application file for complete search history.

(56) References Cited

U.S. PATENT DOCUMENTS

| | | | |
|---|---|---|---|
| 5,818,631 A * | 10/1998 | Askinazi | G02B 1/105 359/350 |
| 6,080,640 A | 6/2000 | Gardner et al. | |
| 6,084,714 A * | 7/2000 | Ushiyama | G02B 27/285 359/485.04 |
| 6,404,550 B1 * | 6/2002 | Yajima | G02B 27/283 348/E5.141 |
| 6,423,640 B1 | 7/2002 | Lee et al. | |
| 6,465,892 B1 | 10/2002 | Suga | |
| 6,887,769 B2 | 5/2005 | Kellar et al. | |
| 6,908,027 B2 | 6/2005 | Tolchinsky et al. | |
| 7,045,453 B2 | 5/2006 | Canaperi et al. | |
| 7,105,980 B2 | 9/2006 | Abbott et al. | |
| 7,193,423 B1 | 3/2007 | Dalton et al. | |
| 7,750,488 B2 | 7/2010 | Patti et al. | |
| 7,803,693 B2 | 9/2010 | Trezza | |
| 8,153,505 B2 * | 4/2012 | Tong | H01L 21/2007 438/455 |
| 8,183,127 B2 | 5/2012 | Patti et al. | |
| 8,300,312 B2 * | 10/2012 | Kobayashi | G02B 27/286 359/485.04 |
| 8,349,635 B1 | 1/2013 | Gan et al. | |
| 8,377,798 B2 | 2/2013 | Peng et al. | |
| 8,441,131 B2 | 5/2013 | Ryan | |
| 8,476,165 B2 | 7/2013 | Trickett et al. | |
| 8,482,132 B2 | 7/2013 | Yang et al. | |
| 8,501,537 B2 | 8/2013 | Sadaka et al. | |
| 8,524,533 B2 | 9/2013 | Tong et al. | |
| 8,620,164 B2 | 12/2013 | Heck et al. | |
| 8,647,987 B2 | 2/2014 | Yang et al. | |
| 8,697,493 B2 | 4/2014 | Sadaka | |
| 8,716,105 B2 | 5/2014 | Sadaka et al. | |
| 8,802,538 B1 | 8/2014 | Liu | |
| 8,809,123 B2 | 8/2014 | Liu et al. | |
| 9,093,350 B2 | 7/2015 | Endo et al. | |
| 9,142,517 B2 | 9/2015 | Liu | |
| 9,171,756 B2 | 10/2015 | Enquist et al. | |
| 9,224,704 B2 | 12/2015 | Landru | |
| 9,230,941 B2 | 1/2016 | Chen et al. | |
| 9,257,399 B2 | 2/2016 | Kuang et al. | |
| 9,299,736 B2 | 3/2016 | Chen et al. | |
| 9,312,229 B2 | 4/2016 | Chen et al. | |
| 9,337,235 B2 | 5/2016 | Chen et al. | |
| 9,394,161 B2 | 7/2016 | Cheng et al. | |
| 9,437,572 B2 | 9/2016 | Chen et al. | |
| 9,443,796 B2 | 9/2016 | Chou et al. | |
| 9,461,007 B2 | 10/2016 | Chun et al. | |
| 9,496,239 B1 | 11/2016 | Edelstein et al. | |
| 9,536,848 B2 | 1/2017 | England et al. | |
| 9,559,081 B1 | 1/2017 | Lai et al. | |
| 9,620,481 B2 | 4/2017 | Edelstein et al. | |
| 9,656,852 B2 | 5/2017 | Cheng et al. | |
| 9,723,716 B2 | 8/2017 | Meinhold | |
| 9,728,521 B2 | 8/2017 | Tsai et al. | |
| 9,744,754 B2 | 8/2017 | Wakamatsu et al. | |
| 9,799,587 B2 | 10/2017 | Fujii et al. | |
| 9,893,004 B2 | 2/2018 | Yazdani | |
| 9,929,050 B2 | 3/2018 | Lin | |
| 9,941,241 B2 | 4/2018 | Edelstein et al. | |
| 9,941,243 B2 | 4/2018 | Kim et al. | |
| 9,960,142 B2 | 5/2018 | Chen et al. | |
| 10,026,605 B2 | 7/2018 | Doub et al. | |
| 9,953,941 B2 | 8/2018 | Enquist | |
| 10,075,657 B2 | 9/2018 | Fahim et al. | |
| 10,269,756 B2 | 4/2019 | Uzoh | |
| 10,276,619 B2 | 4/2019 | Kao et al. | |
| 10,571,699 B1 * | 2/2020 | Parsons | G02B 6/0028 |
| 2002/0003307 A1 | 1/2002 | Suga | |
| 2004/0071424 A1 * | 4/2004 | Hiraka | G02B 6/10 385/129 |
| 2004/0084414 A1 | 5/2004 | Sakai et al. | |
| 2004/0226910 A1 * | 11/2004 | Chatterjee | G02B 5/1814 216/24 |
| 2006/0057945 A1 | 3/2006 | Hsu et al. | |
| 2007/0111386 A1 | 5/2007 | Kim et al. | |
| 2012/0100318 A1 * | 4/2012 | Danzl | H01L 21/187 428/34.1 |
| 2013/0250430 A1 * | 9/2013 | Robbins | G02B 27/0172 359/633 |
| 2014/0071519 A1 * | 3/2014 | Chen | G02F 1/3501 359/328 |
| 2014/0175655 A1 | 6/2014 | Chen et al. | |
| 2015/0064498 A1 | 3/2015 | Tong | |
| 2015/0328875 A1 * | 11/2015 | Hattori | B32B 38/10 310/313 R |
| 2016/0343682 A1 | 11/2016 | Kawasaki | |
| 2018/0175012 A1 | 6/2018 | Wu et al. | |
| 2018/0182639 A1 | 6/2018 | Uzoh et al. | |
| 2018/0182666 A1 | 6/2018 | Uzoh et al. | |
| 2018/0219038 A1 | 8/2018 | Gambino et al. | |
| 2018/0261645 A1 | 9/2018 | Na et al. | |
| 2018/0323177 A1 | 11/2018 | Yu et al. | |
| 2018/0323227 A1 | 11/2018 | Zhang et al. | |
| 2018/0331066 A1 | 11/2018 | Uzoh et al. | |
| 2019/0115277 A1 | 4/2019 | Yu et al. | |
| 2019/0131277 A1 | 5/2019 | Yang et al. | |

FOREIGN PATENT DOCUMENTS

| | | |
|---|---|---|
| JP | 2007-041117 A | 2/2007 |
| JP | 2010-276940 A | 12/2010 |
| JP | 2013-33786 A | 2/2013 |
| JP | 2017-030252 A | 2/2017 |
| JP | 2018-160519 A | 10/2018 |
| WO | 2005-043584 A2 | 5/2005 |

OTHER PUBLICATIONS

Moriceau, H. et al., "Overview of Recent Direct Wafer Bonding Advances and Applications", Advances in Natural Sciences—Nanoscience and Nanotechnology, 2010, 12 pages.
Nakanishi, H. et al., "Studies on SiO2—SiO2 Bonding with Hydrofluoric Acid. Room Temperature and Low Stress Bonding Technique for MEMS," Tech. Research Lab., 200, Elsevier Science S.A., 8 pages.
Oberhammer et al., "Sealing of Adhesive Bonded Devices on Wafer Level," in Sensors and Actuators A, vol. 110, No. 1-3, pp. 407-412, Feb. 29, 2004, see pp. 407-412; and figures 1(a)-1(I), 6 pages.
Plobi et al., "Wafer Direct Bonding: Tailoring Adhesion Between Brittle Materials," Materials Science and Engineering Review Journal, 1999, 88 pages.
Suga et al., "Bump-less Interconnect for Next Generation System Packaging," IEEE (2001) and ECTC 2001, 6 pages.
WO2020028080 Search Report and Written Opinion, dated Jul. 2019, 9 pages.
International Search Report and Written Opinion, dated May 22, 2019, for PCT Application No. PCT/US2019/016652, 10 pages.

* cited by examiner

DIRECT-BONDED LAMINATION FOR IMPROVED IMAGE CLARITY IN OPTICAL DEVICES

BACKGROUND

Optical components often include optical layers in various laminated combinations of glass, reflective metal, transparent polymer, dielectric, and adhesive. The adhesives between joined or laminate layers serve no optical purpose per se, but their presence is taken for granted even though they detrimentally introduce additional materials into the light path. Each additional change of material in the light path introduces some kind of image loss, such as loss of brightness or loss of resolution. This loss of image quality may be due to simple scattering of the light at each new interface, due to partial absorption of light by the adhesive materials or may be due to changes in the angles of refraction between materials, or both.

The amount by which light slows in a given material is described by its index of refraction. The index of refraction of a material is defined by the speed of light in vacuum c divided by the speed of light through the material. Optically dense media have large indices of refraction. In optical apparatuses, different types of glasses, polymers, ceramics, such as transparent spinel, and optical adhesives may have slightly different indices of refraction. Thus, when light speeds up as it passes from one material to another, or vice versa when light slows down between materials, the angle of refraction is larger (or smaller) than the angle of incidence, causing some image loss or distortion along the light path. Although thin, the adhesive layers between transparent materials in an optical device take away some of the perfection an image might have had for a human viewer.

Smartglasses and head-up displays (HUDs) for augmented reality (AR) and virtual reality (VR) devices rely on numerous optical components, such as waveguides, prisms, collimators, convex lenses, reflectors, concave mirrors, combiners, and beam splitters to achieve near-eye optics in the smartglasses, and visual fusion in the head-up displays. Since the light path goes through many laminated optical components, the detrimental effects of conventional adhesive layers are compounded.

SUMMARY

Directly bonded lamination for improved image clarity in smartglasses and other optical devices is provided. An example process planarizes and plasma-activates optical surfaces to be laminated together, then forms direct bonds between the two surfaces without an adhesive or adhesive layer. This process provides improved optics with higher image brightness, less light scattering, better resolution, and higher image fidelity. The direct bonds also provide a refractory interface tolerant of much higher temperatures than conventional optical adhesives. The example process can be used to produce many types of improved optical components, such as improved laminated lenses, mirrors, beam splitters, collimators, prism systems, optical conduits, and mirrored waveguides for smartglasses and head-up displays (HUDs), which provide better image quality and elimination of the dark visual lines that are apparent to a human viewer when conventional adhesives are used in conventional lamination.

This summary is not intended to identify key or essential features of the claimed subject matter, nor is it intended to be used as an aid in limiting the scope of the claimed subject matter.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

DESCRIPTION

This disclosure describes direct bonded lamination for improved clarity in optical devices. In an implementation, example direct bonding techniques aim to minimize or eliminate optical adhesives and glues between optical layers, which can cause loss of image quality in optical devices.

In an implementation, direct oxide bonding between surfaces, such as silicon oxide to silicon oxide bonding, or direct bonding between surfaces with other semiconductor-nonmetal combinations is used to join or laminate optical layers made of glass or other materials, for optical precision. Besides silicone dioxide, other materials may be used for direct bonding, such as silicon nitride ($Si_3N_4$), silicon oxynitride (SiON), silicon carbonitride (SiCN), and other compounds. Elimination of a separate adhesive, or adhesive layer, between surfaces of optical layers improves optical performance, such as higher fidelity of light transmission. The direct bonds between optical surfaces also provide a refractory interface between the first optical surface and the second optical surface that improves the thermal budget of the overall optical component. The glues and adhesives conventionally used to attach two glass pieces together, for example, deteriorate at higher temperature or when used for certain wavelengths of light, certain light intensities, and with high power lasers, hence these conventional optical components that include conventional adhesives are limited to lower operating temperatures and to low power lasers. The direct bonding processes described herein, such as ZiBond® brand direct bonding, eliminates this conventional constraint. The direct bond that incidentally provides the refractory interface has the same coefficient of thermal expansion as one or both of the flat optical surfaces being joined together, and the direct bond providing the refractory interface also has a much higher resistance to heat and a higher resistance to elevated temperatures than conventional optical glues and adhesives.

The example bonding techniques can leave a minimal interface, or in some cases, no interface at all between optical layers when the molecules between two face-to-face surfaces made of the same material have been direct bonded to each other. The elimination of the adhesive, even if only a few microns thick, may reduce visual artifacts during use of some devices, such as the prominence of vertical lines visible to a user of conventional near-eye optics. For example, an example method applies direct bonding to improve a variety of basic waveguides used for near-eye optics in smartglasses and HUDs, which have reflective mirror surfaces at intervals within the waveguide.

Figure 1:
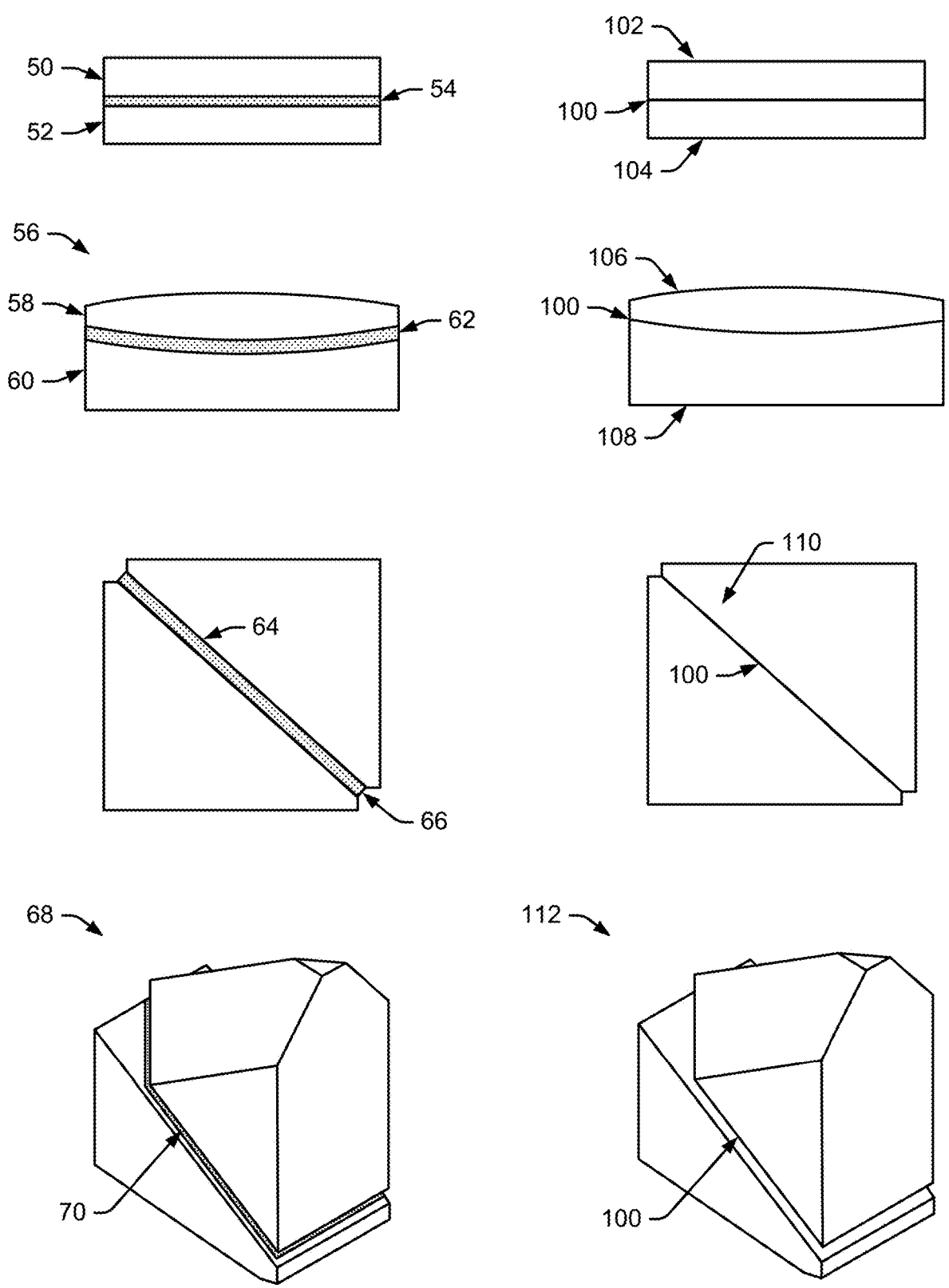
FIG. 1 is a diagram of joined optical components, showing example components with direct-bonded optical layers for optical clarity versus conventional components joined by adhesive layers.

FIG. 1 shows example optical components with surfaces direct-bonded together, instead of cemented together. Two optical blanks 50 & 52 are conventionally adhered together with an adhesive or an intervening adhesive layer 54. A direct bonding interface 100 may join comparable optical blanks 102 & 104, providing improved optical characteristics, due to the absence of the interfering and optically detrimental adhesive layer 54, found in the conventionally joined blanks 50 & 52.

An achromatic lens, such as an achromatic doublet 56, consisting of a convex element 58 and a concave element 60, are conventionally adhered together with a cement 62. The achromatic lenses are corrected to bring two wavelengths, such as blue and red, into focus on the same plane. The convex element 58 and a concave element 60 in the achromatic doublet are usually made of different glasses with different dispersions, such as crown glass and flint glass. The chromatic aberration of one lens 58 is counterbalanced by the chromatic aberration of the other lens 60. Conventional designs seek to minimize the effects of the presence of the conventional cement 62 on calculating the corrections for chromatic and spherical aberrations, by keeping cement layer as thin as possible, and with refractive characteristics compatible with crown glass and flint glass.

A direct bonding interface 100 may join comparable achromatic lens elements 106 & 108 without an intervening conventional cement 62, even though the glass materials for the optical elements being joined are made of molecularly different materials (crown glass and fling glass). The direct bonding interface 100 provides a better achromatic doublet than those made with conventional cements 62.

Likewise, partially mirrored, partially reflective surfaces 64, which also partially transmit incoming light, are used in beam splitters, near-eye optics, and in many other devices, such as interferometers. Beam splitters can be two triangular glass prisms glued together with epoxy, polyester, or a urethane-based adhesive. Thickness of the adhesive layer 66 can be calculated to reflect half the incident light and transmit the other half of the incident light in different directions. Some beam splitters may use a glass or plastic with sputtered aluminum or silver from vapor as a half-silvered mirror coating. A dichroic optical coating may also be used in beam splitters, for laser output or to split off certain wavelengths. The ratio of reflection versus transmission of light depends on the wavelengths of the incident light. Conventional designs may try to incorporate the properties of an adhesive layer 66 into the partially reflective surface 64. An example direct bonding interface 100 can remove the obstacles posed by an adhesive layer 66 in some circumstances. An example direct bonding interface 100 may provide a simpler and more precise partially reflective surface 110 for beam splitters and other optical devices, which can simplify manufacture and eliminate unwanted absorption of light by the conventional adhesive layer 66. The direct bonding interface 100 can eliminate the perception of bands or dark lines in optical devices that use stacked mirrored surfaces by including with partially reflective surfaces 110 that have optically pure interfaces because of the direct bonding interface 100.

Prism systems, such as pairs of Porro prisms in binoculars, or roof prisms, such as Schmidt-Pechan prisms 68, may conventionally use an adhesive interface 70 or may use an air interface, to avoid using the conventional adhesive interface 70. An example direct bonding interface 100, by comparison, can provide a better combination of prisms 12, with a truly transparent interface or no interface at all between direct-bonded surfaces of the same glass material.

The direct bonding interface 100 may also be used to implement other types of layers and coatings in a layered optical component. Often, entry and exit surfaces are optically coated to minimize light loss and a given coating may have good anti-reflective properties or good reflective properties. The example direct bonding interfaces 100 are especially useful for internal reflective (mirrored) and anti-reflective coatings implemented between layers of glass and laminate stacks of coated elements.

The example direct bonding interface 100 also provides superior optics when a dielectric coating is employed, rather than a metallic mirror coating. The example direct bonding interface 100 can provide laminate stacks of multiple dielectric mirrors, providing much better reflectivity of visible light than either aluminum or silver metal coatings.

The example direct-bond joining and lamination methods can be applied to many generic and specialized optical elements and devices to supersede and replace conventional techniques and conventional materials for bonding optical elements together, such as polyesters, epoxies, urethanes, resin adhesives, Canada Balsam, and other one and two component adhesives 54 & 62 & 66 & 70 for bonding optical elements.

Figure 2:
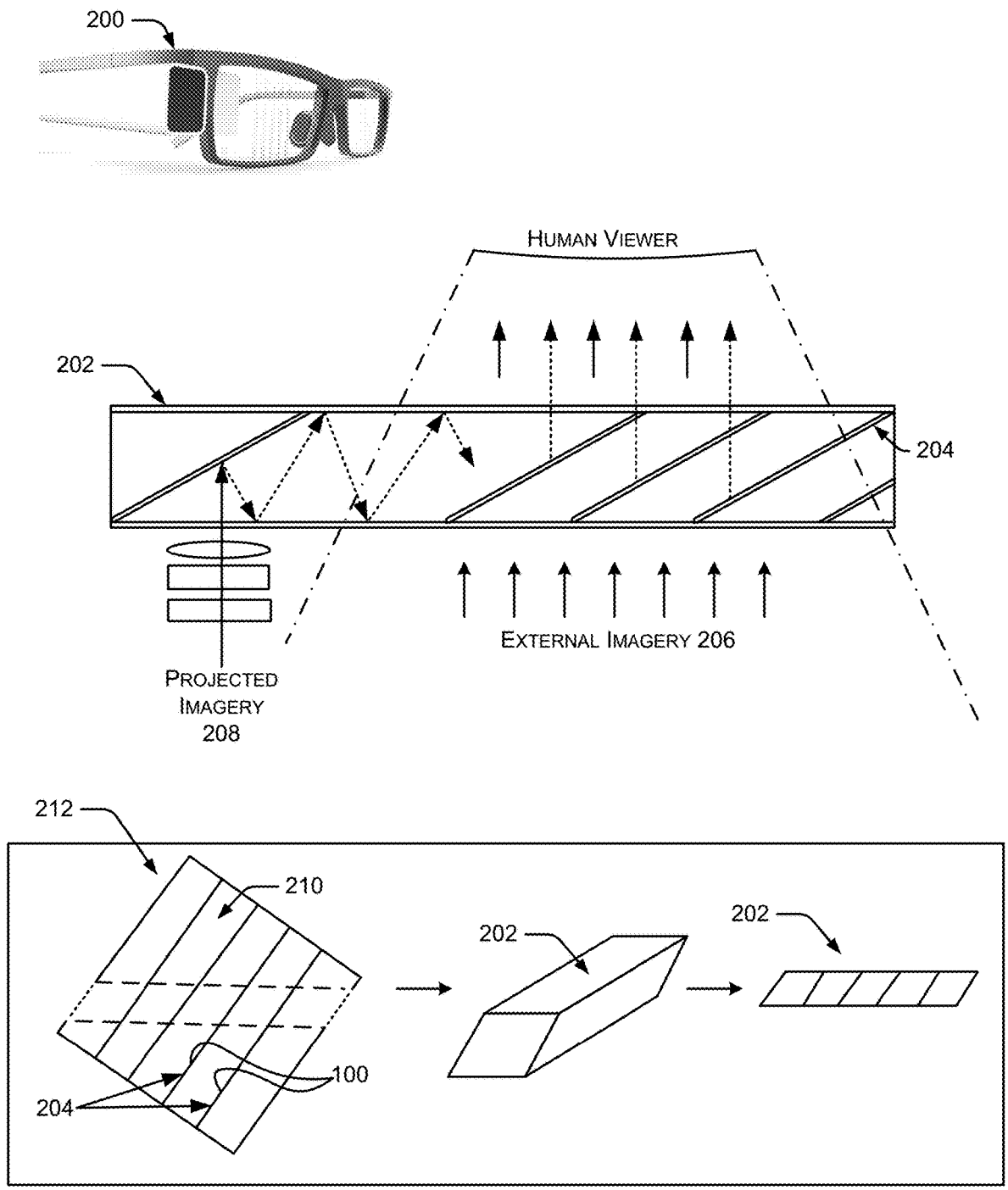
FIG. 2 is a diagram of an example mirrored optical waveguide that can be improved with direct-bonded surfaces between optical layers instead of surfaces joined with conventional adhesives.

FIG. 2 shows wearable computer glasses 200 that add information alongside or in addition to what the user observes through the lenses. Such smartglasses 200 may benefit from optics that incorporate the example direct bonding interfaces 100 described herein. Example conventional smartglasses or their conventional mirrored waveguides are made by companies such as Lumus (Rechovot, Israel), Optinvent (Rennes, France), and Journey Technologies (Beijing, China). An example waveguide assembly 202 may use a series of partially reflective surfaces 204 to mirror a projected image, as described in U.S. Pat. Nos. 6,829,095 and 8,432,614, which are incorporated herein in their entireties. The partially reflective surfaces 204 allow external real-time imagery 206 to pass through the lenses of the smartglasses 200, while also reflecting projected imagery 208 to the human viewer. Because of the relatively small dimensions of the optical parts, the conventional optical adhesives used to laminate lenses and multiple glass layers together present extra layers of material in the light path that decrease the image quality. This lamination with conventional adhesives, especially at the interface of the reflective mirrored surfaces 204, can create perceived visible lines in the viewing field, undesirable to the viewer. The example lamination process described herein to make direct bonding interfaces 100 can laminate the optical layers together without conventional adhesives, resulting in more precise imagery and elimination of the artifactual lines in the viewing field. The example direct bonding interfaces 100 described herein enable better clarity for both the pass-through imagery 206 and the projected imagery 208 reflected to the human viewer off the array of partially reflective mirrored surfaces 204.

In an example process for making the mirrored waveguides 202 that use an array of reflective mirror surfaces 204 for near-eye optics, multiple glass layers or pieces 210 are coated with a layer that is at least partially reflective, then direct-bonded together into a stack 212. The direct bonding interfaces 100 can create the reflective surfaces 204 between each layer 210. The laminated stack 212 is then diced at an oblique angle to a perpendicular of the reflective surfaces 204 to produce the mirrored waveguide 202, with reflective surfaces 204 situated at a useful angle for guiding projected images 208 to the human eye.

Figure 3:
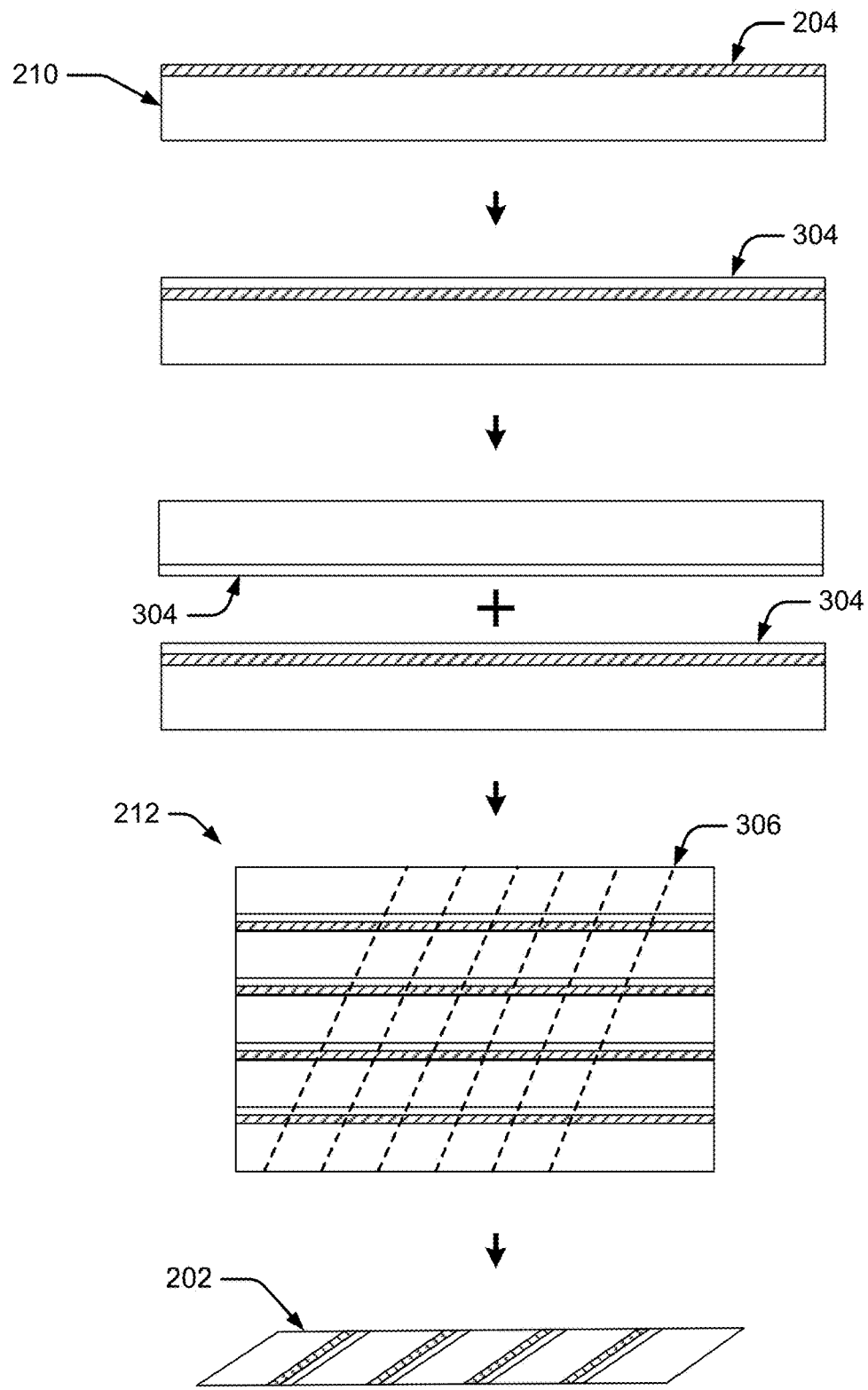
FIG. 3 is an example method of making mirrored optical waveguides using optical components with surfaces direct-bonded together instead of adhered together with adhesive materials.

FIG. 3 shows an example process of making the example mirrored waveguide 202 with direct oxide-bonded reflective surfaces. In an implementation, a thin layer of fully or partially reflective mirror coating 204 is deposited on a glass wafer or panel 210. Then, a thin layer of silicon oxide (e.g., $SiO_2$) 304 that is approximately 0.01-5.00 μm thick is deposited on top of the thin mirror coating 204 on the glass wafer or panel 210. The glass panel 210 is direct oxide-bonded to the next glass panel 210, via a respective oxide layer 304.

In another implementation, a thin layer of silicon nitride ($Si_3N_4$), silicon oxynitride (SiON), or silicon carbonitride (SiCN) can be deposited as an alternative to $SiO_2$, layer 304. In another implementation, a combination of the above layers ($SiO_2$, $Si_3N_4$, SiON, and/or SiCN) can be deposited on top of the thin mirror coating 204 on the glass wafer or panel 210.

Repeating the coating and bonding steps above creates the multi-wafer or multi-panel stack 212. With the laminations vertical, the stack 212 is vertically diced or singulated at an angle 306 as shown, to produce the individual mirrored waveguides 202.

In various implementations, example apparatuses may include a first optically transparent substrate including a first flat surface, a second optically transparent substrate including a second flat surface, and a direct chemical bond between a material of the first flat surface of the first optically transparent substrate and a material of the second flat surface of the second optically transparent substrate.

The material of the first flat surface and the material of the second flat surface may comprise the same material bonded to itself across the direct bond. The direct bond itself may comprise a direct silicon oxide-to-silicon oxide bond between the first flat surface and the second flat surface. The direct bond can be a contact bond spontaneously formed at room temperature, such as a ZiBond® brand direct bond or a DBI® brand hybrid direct bond, when metallic components such as mountings or electrical conductors are involved in the direct bond interface, both bonding techniques available from Invensas Bonding Technologies, Inc. (formerly Ziptronix, Inc.), an Xperi company (see for example, U.S. Pat. Nos. 6,864,585 and 7,485,968, which are incorporated herein in their entirety).

As part of the direct bonding process, the first flat surface and the second flat surface may be polished flat by a chemical-mechanical polishing (CMP) tool. The first flat surface and the second flat surface may then be activated by a plasma process in preparation for the formation of the direct chemical bond, such as a nitrogen-based plasma etch process or a reactive ion plasma etch process.

The direct bond is formed at room temperature, and then after formation, can be strengthened by annealing at a higher temperature of approximately 150° C. and above.

As a mirrored waveguide 202, an example apparatus has at least partially reflective coatings 204 on one or both of the first flat surface and the second flat surface. The fully or partially reflective coating can be aluminum, silver, gold, platinum, mercury, magnesium fluoride, titanium dioxide, silicon dioxide, zinc sulphide, tantalum pentoxide, a reflective dielectric, or a Bragg mirror, or the combination of two or more such coatings, for example. Other partially or fully reflective coatings, not included in the above list, may also be used.

The laminated bond between optical surfaces may include one or more thin layers of a silicon oxide or $Si_3N_4$, SiON, and/or SiCN covering each reflective coating 204, prior to the direct oxide or direct oxide-to-oxide bonding. Since the oxide layer(s) are ultra-thin, at approximately 0.01-5.00 μm, the resulting bond may be considered optically clear, or may be considered a large improvement over much thicker layers of optically dense adhesive, as conventionally used. A given apparatus may also have one or more layers of one or more optically transparent dielectrics covering each reflective coating 204, as desired for a given application. As a mirrored waveguide 202, other optical and display components may be added to create smartglasses, head-up displays (HUDs), or other optical devices.

Figure 4:
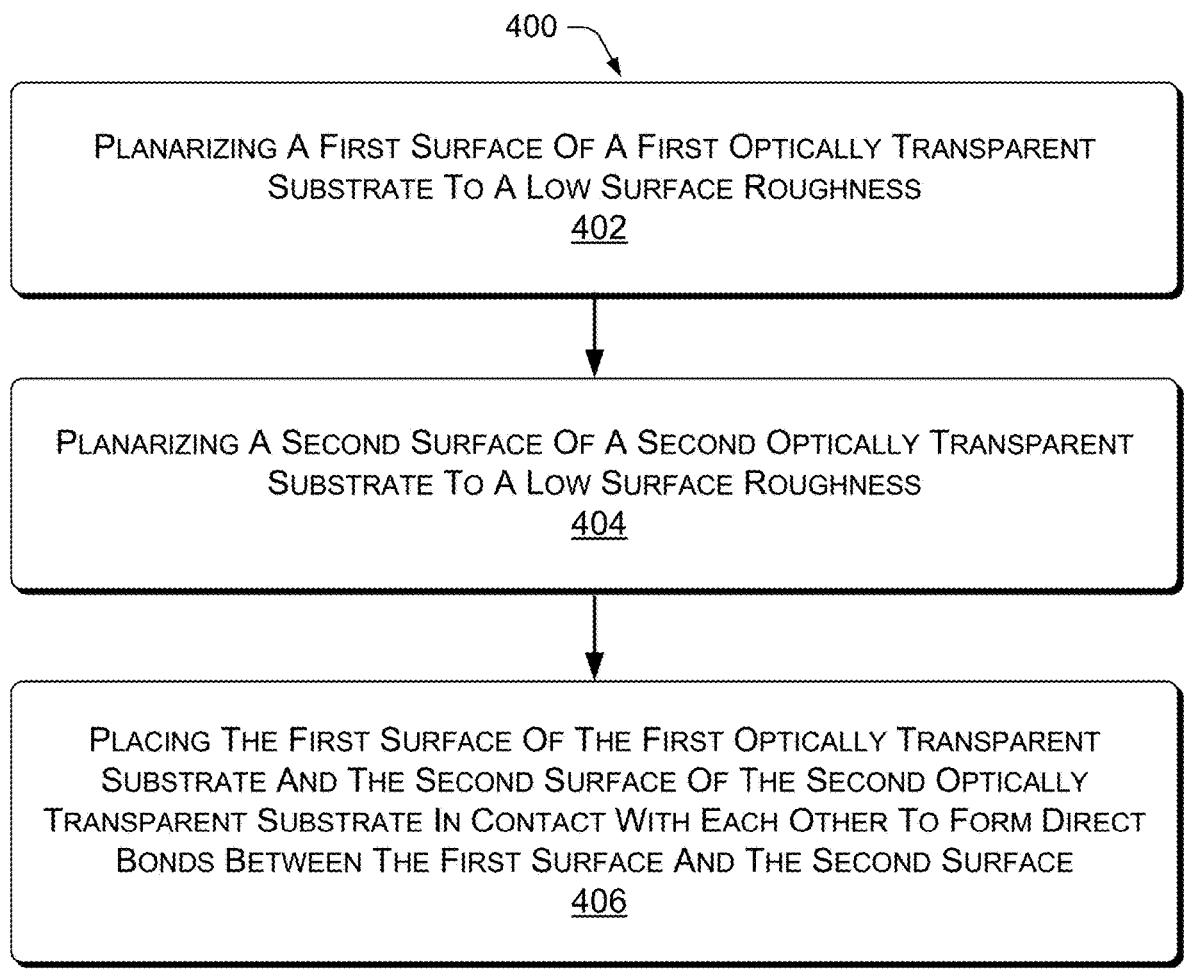
FIG. 4 is an example method of making joining or laminating optical layers with direct-bonded surfaces instead of optically dense conventional adhesives.

FIG. 4 shows an example method 400 of making laminated optical layers with direct-bonding instead of thicker layers of conventional optically dense adhesives. In FIG. 4, individual operations are shown as separate blocks.

At block 402, a first surface of a first optically transparent substrate is planarized to a low surface roughness.

At block 404, a second surface, of a second optically transparent substrate, is also planarized to a low surface roughness.

At block 406, the first surface of the first optically transparent substrate and the second surface of the second optically transparent substrate are placed in contact with each other to form direct bonds between the first surface and the second surface.

In the example method 400, the first optically transparent substrate and the second optically transparent substrate may be glasses (for example, quartz, fused silica, borosilicate glass, sapphire, crown glass, flint glass, and so forth) but can also be polymers, ceramics, and other materials too. The first optically transparent substrate and the second optically transparent substrate can each be layers of an optical device, such as an optical waveguide, a prism, a collimator, a lens, a reflector, a mirror, a combiner, a beam splitter, and a diffraction grating.

The first surface of the first optically transparent substrate and the second surface of the second optically transparent substrate are placed in contact with each other at an ambient room temperature to form the bond between the first surface and the second surface at room temperature, and after forming the bonds, the process may optionally include heating the first optically transparent substrate and the second optically transparent substrate, or their bonded surfaces, to a temperature of approximately 150° C. to strengthen the bonds. The subsequent annealing process, or passage of time, strengthens the bond with low bond distortion, minimal bond stress, and increased bond hermeticity (water-tightness and air-tightness). The first and second optically transparent substrates are then cooled to a room temperature, when annealing is used.

The example method 400 works on non-transparent or even opaque substrates and materials too.

Planarizing the first surface of the first optically transparent substrate and the second surface of the second optically transparent substrate to a low surface roughness may entail polishing the first and second surfaces with a chemical-mechanical polishing (CMP) tool. Or the surfaces may be made sufficiently flat during their formation or manufacture.

The example method 400 may also include activating the first surface and the second surface with a plasma process in preparation for the spontaneous formation of the bonds between the two surfaces at room temperature. The plasma process may be a nitrogen-based etch process or a reactive ion etch process. The subsequent thermal treatment and time improves the bond strength.

To make mirrored waveguides, the method 400 includes depositing a reflective coating on one or both of the first surface or the second surface. The reflective coating may be partially reflective, for pass-through or HUD applications. The reflective coating may be aluminum, silver, gold, platinum, or mercury, and also magnesium fluoride, titanium dioxide, silicon dioxide, zinc sulphide, tantalum pentoxide, a reflective dielectric, or a Bragg mirror, or the combination of two or more such coatings, may also be used as layers.

The reflective coating may be covered by a thin layer of an oxide or a nitride (0.01-5.00 µm thickness). Forming the spontaneous chemical bonds may consist of direct oxide-to-oxide bonding respective layers of the thin oxide or nitride on the first optically transparent substrate and the second optically transparent substrate. The reflective coating(s) may also be covered with one or more layers of one or more optically transparent dielectrics.

The process is repeated to make a stack of optically transparent substrates comprising an optical waveguide, or a mirrored optical waveguide. A reflective coating is added to at least some the optically transparent substrates of the stack to make a waveguide with an array of multiple embedded mirror surfaces.

The direct bonding, direct oxide bonding, or direct oxide-to-oxide bonding may be DBI® brand bonding or ZiBond® brand direct oxide bonding, both available from Invensas Bonding Technologies, Inc. (formerly Ziptronix, Inc.), an Xperi company (see for example, U.S. Pat. Nos. 6,864,585 and 7,485,968, which are incorporated herein in their entirety). ZiBond® brand direct bonding, for example, is a low-temperature wafer-to-wafer or die-to-wafer or die-to-die bonding technique between wafers or dies with the same or different coefficients of thermal expansion (CTE), using a low-temperature homogeneous (oxide-to-oxide) direct bonding technology. ZiBond direct bonding offers multiple benefits over conventional bonding techniques such as adhesives, anodic bonding, eutectic bonding and glass frit. Bonding is performed at room temperature, which enhances overall yield and reliability, by eliminating the negative effects associated with coefficient of expansion (CTE) mismatch, warpage and distortion. Higher throughput and lower cost-of-ownership are realized by using industry-standard wafer alignment and bonding equipment. Without requiring elevated temperature or high pressure during bonding, the high-throughput of the ZiBond direct bonding fabrication process minimizes cost-of-manufacturing during mass-production for high volume market applications. During ZiBond direct bond processing, industry standard dielectric surfaces like silicon dioxide or silicon carbide nitride are polished to low surface roughness using conventional chemical-mechanical polishing (CMP) tools, and nitrogen-based chemistries are applied through conventional plasma etch processing. Prepared wafer surfaces are then simply aligned and placed together, resulting in the spontaneous formation of chemical bonds between dies and/or wafers. A very strong, low distortion bond with a bond strength about half the strength of silicon can be obtained at room temperature, and a reliable hermetic bond stronger than silicon can be obtained after moderate heating to about 150° C. in batch processes outside of the alignment and placement tool, for example.

In the specification and following claims: the terms "connect," "connection," "connected," "in connection with," and "connecting," are used to mean "in direct connection with" or "in connection with via one or more elements." The terms "couple," "coupling," "coupled," "coupled together," and "coupled with," are used to mean "directly coupled together" or "coupled together via one or more elements."

While the present disclosure has been disclosed with respect to a limited number of embodiments, those skilled in the art, having the benefit of this disclosure, will appreciate numerous modifications and variations possible given the description. It is intended that the appended claims cover such modifications and variations as fall within the true spirit and scope of the disclosure.

The invention claimed is:

1. A method of forming a mirrored optical waveguide, the method comprising:
    creating a stack comprising a first optically transparent substrate and a second optically transparent substrate, the creating comprising:
        planarizing a first surface of the first optically transparent substrate;
        planarizing a second surface of the second optically transparent substrate;
        depositing one or more reflective coatings on at least one of the first surface or the second surface, wherein the one or more reflective coatings is at least partially reflective; and
        placing the first surface of the first optically transparent substrate and the second surface of the second optically transparent substrate in contact with each other for forming direct bonds between the first surface and the second surface at room temperature, wherein forming the direct bonds between the first surface and the second surface further comprises forming a refractory interface between the first surface and the second surface, the direct bonds comprising the refractory interface having a same coefficient of thermal expansion as the first surface or the second surface, and the direct bonds comprising the refractory interface having a high resistance to heat and a high resistance to elevated temperatures; and
    dicing the stack at an oblique angle to a perpendicular of the one or more reflective coatings.

2. The method of claim 1, wherein the first optically transparent substrate comprises a material selected from a group consisting of a glass, a fused silica, a quartz, a sapphire, a borosilicate, a plastic, or a ceramic and the second optically transparent substrate comprises a material selected from the group consisting of a glass, a fused silica, a quartz, a sapphire, a borosilicate, a plastic, or a ceramic.

3. The method of claim 1, wherein the first surface of the first optically transparent substrate and the second surface of the second optically transparent substrate are placed in contact with each other at an ambient room temperature to form spontaneous chemical bonds between the first surface and the second surface.

4. The method of claim 3, further comprising, after forming the spontaneous chemical bonds, heating the first optically transparent substrate and the second optically transparent substrate to a temperature of approximately 150° C. to strengthen the spontaneous chemical bonds; and cooling the first optically transparent substrate and the second optically transparent substrate to a room temperature.

5. The method of claim 3, further comprising activating the first surface and the second surface with a plasma process in preparation for spontaneous formation of the spontaneous chemical bonds.

6. The method of claim 5, wherein the plasma process comprises a nitrogen-based etch process or a reactive ion etch process.

7. The method of claim 1, wherein at least one of the one or more reflective coatings is fully reflective.

8. The method of claim 1, wherein the one or more reflective coatings is selected from the group consisting of aluminum, silver, gold, platinum, mercury, magnesium fluoride, titanium dioxide, silicon dioxide, zinc sulphide, tantalum pentoxide, a reflective dielectric, and a Bragg mirror.

9. The method of claim 1, further comprising covering the one or more reflective coatings with a layer of a silicon oxide, silicon nitride, silicon carbonitride or silicon oxynitride and forming spontaneous chemical bonds between respective layers of the silicon oxide, silicon nitride, silicon carbonitride or silicon oxynitride on the first optically transparent substrate and the second optically transparent substrate.

10. The method of claim 1, further comprising covering the one or more reflective coatings with one or more layers of one or more optically transparent dielectrics.

11. An apparatus, comprising:
a first optically transparent substrate including a first flat surface;
a second optically transparent substrate including a second flat surface;
one or more reflective coatings on at least one of the first flat surface or the second flat surface, wherein the one or more reflective coatings is at least partially reflective; and
a direct bond between a material of the first flat surface of the first optically transparent substrate and a material of the second flat surface of the second optically transparent substrate,
wherein the direct bond comprises a refractory interface between the first flat surface and the second flat surface, the direct bond comprising the refractory interface having a same coefficient of thermal expansion as the first flat surface or the second flat surface, and the direct bond comprising the refractory interface having a high resistance to heat and a high resistance to elevated temperatures, and
wherein the apparatus has an oblique shape with respect to a perpendicular of the one or more reflective coatings.

12. The apparatus of claim 11, wherein the material of the first flat surface and the material of the second flat surface comprise a same material, and wherein the material of the first flat surface is bonded to the material of the second flat surface across the direct bond.

13. The apparatus of claim 11, wherein the direct bond comprises a direct silicon oxide, silicon nitride, silicon carbonitride or silicon oxynitride bond between the first flat surface and the second flat surface.

14. The apparatus of claim 11, wherein the first optically transparent substrate comprises a material selected from a group consisting of a glass, a fused silica, a quartz, a sapphire, a borosilicate, a plastic, or a ceramic and the second optically transparent substrate comprises a material selected from the group consisting of a glass, a fused silica, a quartz, a sapphire, a borosilicate, a plastic, or a ceramic.

15. The apparatus of claim 11, wherein at least one of the one or more reflective coatings is fully reflective.

16. The apparatus of claim 11, wherein the one or more reflective coatings are selected from the group consisting of aluminum, silver, gold, platinum, mercury, magnesium fluoride, titanium dioxide, silicon dioxide, zinc sulphide, tantalum pentoxide, a reflective dielectric, and a Bragg mirror.

17. The apparatus of claim 11, further comprising a layer of a silicon oxide, silicon nitride, silicon carbonitride or silicon oxynitride on the one or more reflective coatings.

18. The apparatus of claim 11, further comprising one or more layers of one or more optically transparent dielectrics over the one or more reflective coatings.

19. A method of forming a mirrored optical waveguide, the method comprising:
creating a stack comprising a first optically transparent substrate and a second optically transparent substrate, the creating comprising:
planarizing a first surface of the first optically transparent substrate;
planarizing a second surface of the second optically transparent substrate;
depositing one or more reflective coatings on at least one of the first surface or the second surface, wherein the one or more reflective coatings is at least partially reflective;
covering the one or more reflective coatings with a layer of a silicon oxide, silicon nitride, silicon carbonitride or silicon oxynitride;
placing the first surface of the first optically transparent substrate and the second surface of the second optically transparent substrate in contact with each other for forming direct bonds between the first surface and the second surface at room temperature; and
forming spontaneous chemical bonds between respective layers of the silicon oxide, silicon nitride, silicon carbonitride or silicon oxynitride on the first optically transparent substrate and the second optically transparent substrate; and
dicing the stack at an oblique angle to a perpendicular of the one or more reflective coatings.

* * * * *